(12) United States Patent
Miller et al.

(10) Patent No.: US 8,981,714 B2
(45) Date of Patent: Mar. 17, 2015

(54) STORAGE TRAY WITH CHARGING

(75) Inventors: Thomas A. Miller, Royal Oak, MI (US); Roy Thorsell, Royal Oak, MI (US)

(73) Assignee: Toyoda Gosei Co. Ltd., Aichi (JP)

( * ) Notice: Subject to any disclaimer, the term of this patent is extended or adjusted under 35 U.S.C. 154(b) by 446 days.

(21) Appl. No.: 13/234,065

(22) Filed: Sep. 15, 2011

(65) Prior Publication Data

US 2012/0062175 A1 Mar. 15, 2012

Related U.S. Application Data

(60) Provisional application No. 61/383,324, filed on Sep. 15, 2010.

(51) Int. Cl.
*H02J 7/00* (2006.01)
*H02J 7/02* (2006.01)

(52) U.S. Cl.
CPC ............... *H02J 7/025* (2013.01); *Y02T 90/122* (2013.01)
USPC ........... 320/108; 320/110; 320/111; 320/113; 320/115

(58) Field of Classification Search
USPC ......................................... 320/108
See application file for complete search history.

(56) References Cited

U.S. PATENT DOCUMENTS

| | | | |
|---|---|---|---|
| 4,091,318 A * | 5/1978 | Eichler et al. | 320/113 |
| 7,566,984 B2 * | 7/2009 | Blanchard | 307/9.1 |
| 2003/0122392 A1 * | 7/2003 | Larsen et al. | 296/24.1 |
| 2003/0211871 A1 * | 11/2003 | Nassimi | 455/575.1 |
| 2004/0145343 A1 * | 7/2004 | Naskali et al. | 320/108 |
| 2007/0236174 A1 * | 10/2007 | Kaye | 320/112 |
| 2008/0048466 A1 * | 2/2008 | Singh et al. | 296/37.8 |
| 2008/0079388 A1 * | 4/2008 | Sarnowsky et al. | 320/103 |
| 2009/0072782 A1 * | 3/2009 | Randall | 320/107 |
| 2009/0278493 A1 * | 11/2009 | Alden | 320/108 |
| 2010/0156345 A1 * | 6/2010 | Phelps, III | 320/108 |
| 2010/0156347 A1 * | 6/2010 | Lee et al. | 320/108 |
| 2010/0194206 A1 * | 8/2010 | Burdo et al. | 307/104 |
| 2010/0201189 A1 * | 8/2010 | Kirby et al. | 307/9.1 |
| 2010/0207575 A1 * | 8/2010 | Pijnenburg et al. | 320/108 |
| 2011/0018679 A1 * | 1/2011 | Davis et al. | 340/3.1 |
| 2012/0032631 A1 * | 2/2012 | Bourilkov et al. | 320/108 |
| 2012/0235632 A9 * | 9/2012 | Kassayan et al. | 320/108 |
| 2012/0299554 A1 * | 11/2012 | Kruglick | 320/160 |
| 2013/0234481 A1 * | 9/2013 | Johnson | 297/217.3 |

* cited by examiner

*Primary Examiner* — M'Baye Diao
(74) *Attorney, Agent, or Firm* — Carlson, Gaskey & Olds P.C.

(57) ABSTRACT

A wireless charging system includes a charging pad including a base having a coil. The charging pad includes an electrical connector connected to the coil for supplying power to the coil. The charging pad can be connected by an AC cord to a household AC outlet via the electrical connector. The charging pad can also be connected to a vehicle connector for connecting the charging pad to a vehicle electrical supply. In this manner, the wireless charging pad can be used for both home and vehicle charging.

9 Claims, 3 Drawing Sheets

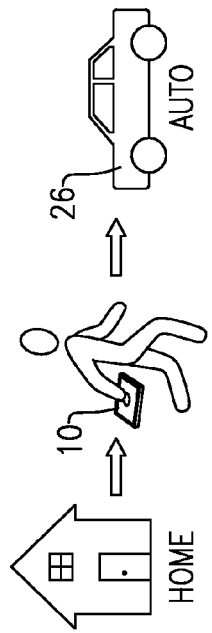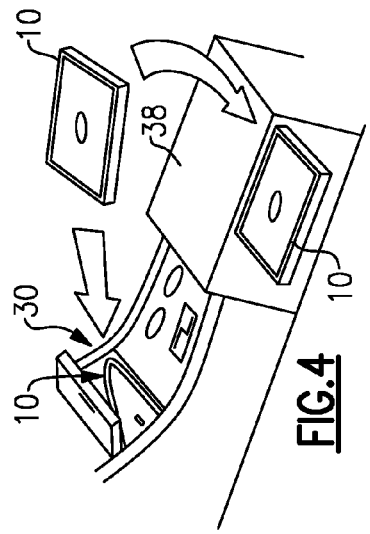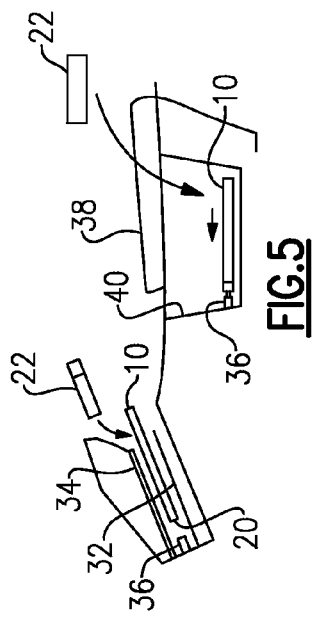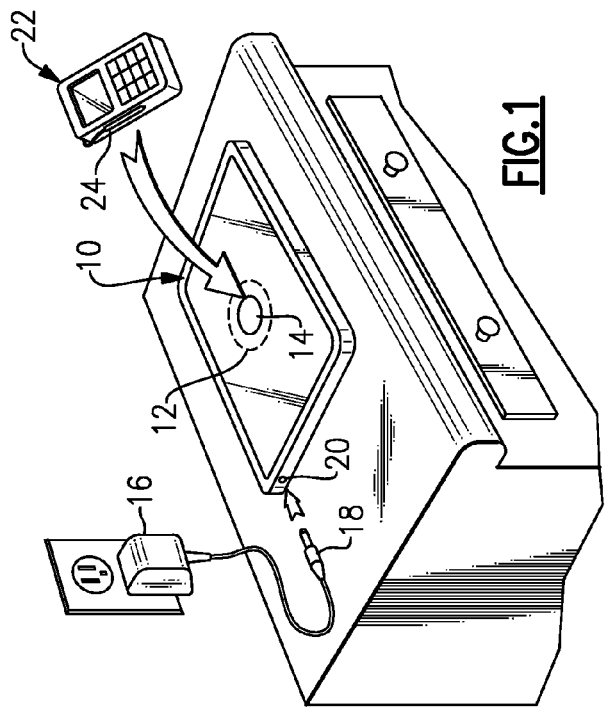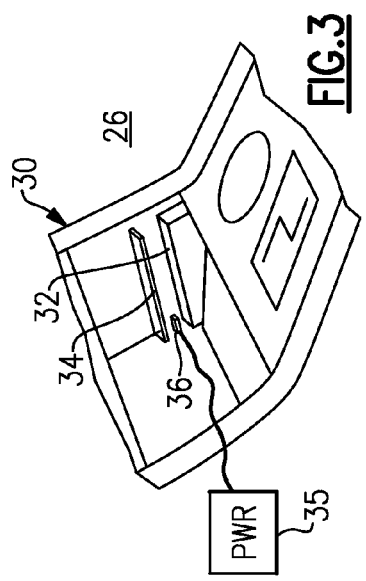

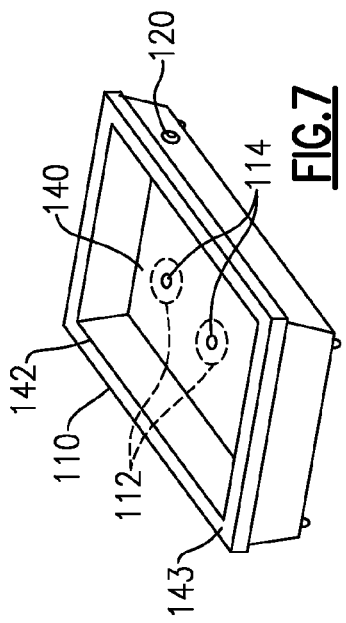
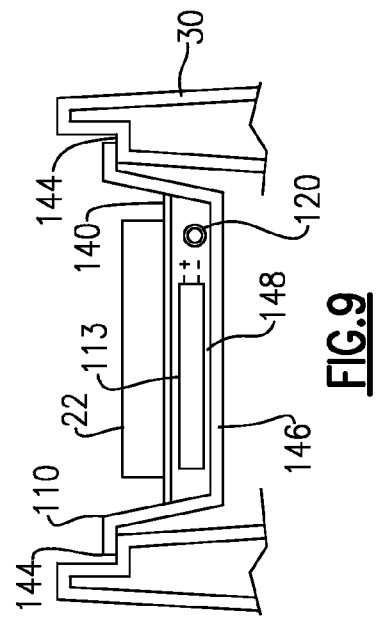
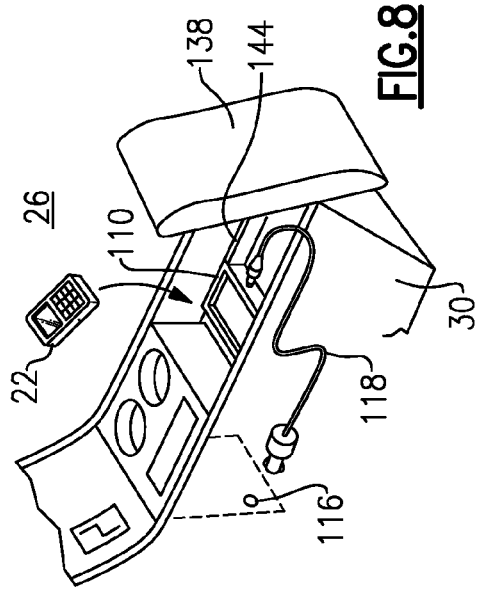
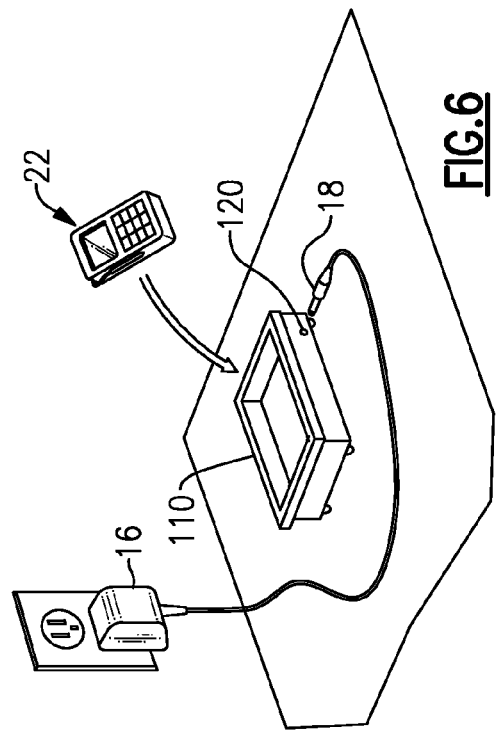

US 8,981,714 B2

STORAGE TRAY WITH CHARGING

This application claims priority to U.S. Provisional Application Ser. No. 61/383,324, filed Sep. 15, 2010.

BACKGROUND

Wireless charging of electronic devices via induction is becoming more standard. Electronic devices can be charged or powered via induction without direct electrical conductive contact. There are several standards, including Qi, but any wireless or inductive power supply or charging could be used in the present invention.

SUMMARY

A wireless charging system includes a charging pad including a base having a coil. The charging pad includes an electrical connector connected to the coil for supplying power to the coil. The charging pad can be connected by an AC cord to a household AC outlet via the electrical connector. The charging pad can also be connected to a vehicle connector for connecting the charging pad to a vehicle electrical supply. In this manner, the wireless charging pad can be used for both home and vehicle charging.

BRIEF DESCRIPTION OF THE DRAWINGS

FIG. 1 shows a wireless charging system in a home.

FIG. 2 shows the wireless charging pad of FIG. 1 being transported from the home of FIG. 1 to the user's vehicle.

FIG. 3 shows a front portion of a vehicle console into which the wireless charging pad can be connected.

FIG. 4 shows a perspective view of the vehicle console of FIG. 3.

FIG. 5 is a section view of the vehicle console of FIG. 4.

FIG. 6 shows a wireless charging system according to a second embodiment being used in the home.

FIG. 7 is a perspective view of the wireless charging pad of FIG. 6.

FIG. 8 is a perspective view of a vehicle console in which the wireless charging pad of FIG. 7 can be used.

FIG. 9 is a section view of the vehicle console and wireless charging pad of FIG. 8.

DETAILED DESCRIPTION OF THE PREFERRED EMBODIMENT

Figure 10:
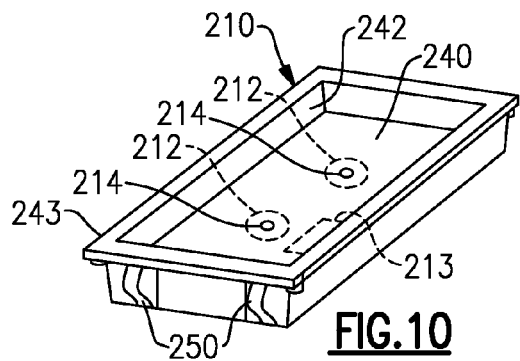
FIG. 10 is a perspective view of a wireless charging pad according to a third embodiment.

A wireless charging/power pad 10 is shown in FIG. 1. As is known, the pad 10 includes a base containing a power coil 12 and an optional magnet 14 to assist alignment with the device to be charged. An AC power adapter 16 provides power (e.g. ac power) to the pad 10 via a cable 18 connected to a jack 20 on the pad 10. As is also known, the electronic device, which may be a phone 22 or other electronic device, includes a receiving coil 24.

When the phone 22 is placed on the pad 10, the power coil 12 is provided with current in a manner according to the proper standard. The receiving coil 24 on the phone receives power from the power coil 12 according to the appropriate standard. This can be used to power and/or charge the phone 22 (or other electronic device, such as music player, video player, gps unit, or any communications, navigations, entertainment or other electronic device).

As shown in FIG. 2, the user can take the pad 10 from home to a car 26.

Referring to FIG. 3, in the car 26, the vehicle console 30 includes a shelf 32. Rails 34 are spaced above the shelf 32. A power source pin 36 is at the back of the shelf 32. The power source pin 36 is connected to a power source 35 in the vehicle 26. The power source 35 may include an inverter connected to the vehicle battery, such that the power source 35 generates ac power appropriate for the wireless charging standard being implemented.

Referring to FIGS. 4 and 5, the pad 10 can be slid into the console 30 between the shelf 32 and the rails 34 where the power source pin 36 is inserted into the jack 20 on the pad 10. In this position, the phone 22 (or other device) can be set on the pad 10 on the shelf 32.

As is also shown in FIGS. 4 and 5, the pad 10 can also be placed inside the storage bin 40 in the console 30 under the lid 38, where it receives power from another power pin. Again, the phone 22 can be charged while sitting on the pad 10 in the storage bin 40.

In FIGS. 6-9, the pad 110 is in the form of a tray, which again at home has an AC adapter 16 and cord 18 and can be used to wirelessly charge an electronic device, such as a phone 22. As shown in FIG. 7, the pad 110 includes a base wall 140 and a perimeter wall 142 having a lip 143 protruding outwardly from an upper edge thereof. A jack 120 connects power to one or more power coils 112, which may be associated with magnets 114.

Referring to FIGS. 8 and 9, the pad 110 can be placed in the vehicle console 30 on side shelves 144, with the lip 143 of the pad 110 supported on the shelves 144 in the console 30. A power cord 118 can connect a power point 116 in the vehicle 26 to the jack 120 on the pad 110. Alternatively, a power source 35 (FIG. 3) could be provided as before. As shown in FIG. 9, the lip of the pad 110 is supported on the shelves. The coil 148 and other electronics are disposed between the base wall 140 and a lower base wall 146. The phone 22 can be charged while sitting in the pad 110. Foam or padding may be placed on the base wall 140 to reduce vibration. The electronics 113 for providing the appropriate power to the coils 112 may be provided between the base wall 140 and the lower base wall 146, such as hardware for providing the appropriate ac frequency to the coils 112 (FIG. 7) from the dc power from the vehicle 26 received through the jack 120 (alternatively, there may be an external power source, as shown as an example in the previous embodiment).

Figure 11:
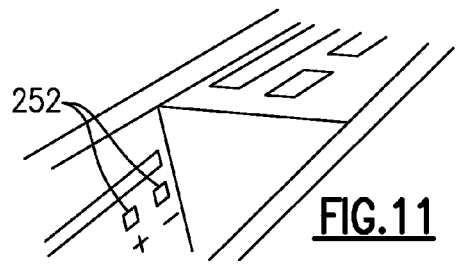
FIG. 11 is a perspective view of a portion of a vehicle console into which the wireless charging pad of FIG. 10 can be connected.
Figure 12:
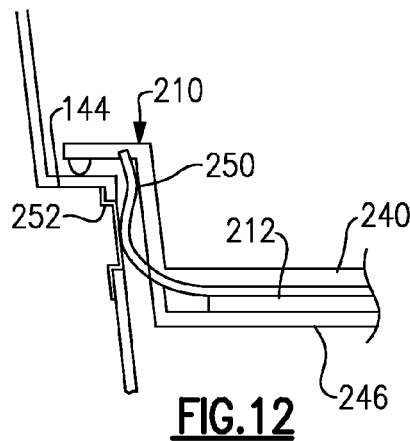
FIG. 12 is a section view of a portion of the console and wireless charging pad of FIGS. 10 and 11 together.

In FIGS. 10-12, the pad 210 is again in the form of a tray with a base wall 240 and a perimeter wall 242 having a lip 243. The coils 212, magnets 214 and electronics 213 may be below the base wall 240. Contacts 250 on the exterior of the perimeter wall snap-fit into contact with power supply contacts 252 (FIGS. 11 and 12). A coil 212 is mounted in the base of the pad 210 between the base wall 240 and a lower base wall 246 to charge an electronic device.

Figure 13:
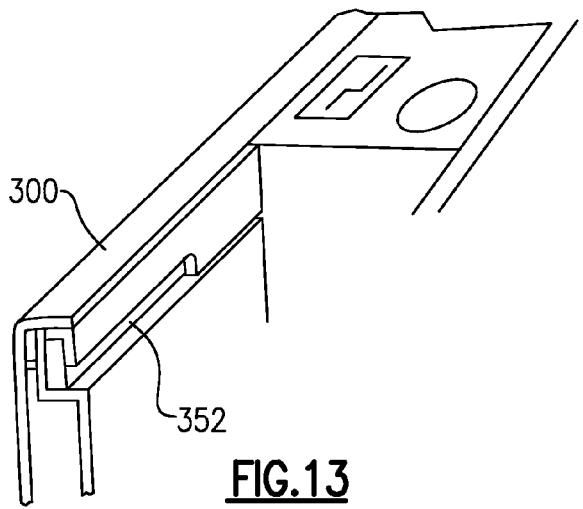
FIG. 13 is a perspective view of a portion of console according to a fourth embodiment that can be connected to a wireless charging pad.

FIG. 13 shows a different console 300 configuration including a conductive channel 352 for contacting a pad 210.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wireless charging system including:
    a charging pad including a base having a coil, the charging pad including an electrical connector connected to the coil for supplying power to the coil;
    an AC cord for connecting the charging pad to a household AC outlet via the electrical connector; and
    a vehicle console including a vehicle connector for connecting the charging pad to a vehicle electrical supply, wherein the vehicle console includes a storage bin, and wherein the charging pad can be connected to the vehicle connector inside the storage bin.

2. The wireless charging system of claim 1 wherein the vehicle console includes at least one shelf into which the charging pad can be slid.

3. The wireless charging system of claim 2 wherein the charging pad connects with the vehicle connector as it is slid into the shelf.

4. The wireless charging system of claim 1 further including an electronic device having a receiving coil complementary to coil on the charging pad, the electronic device positioned on the charging pad such that the receiving coil is receiving power from the coil on the charging pad to send power to the electronic device.

5. A wireless charging system including:
    a charging pad including a base having a coil, the charging pad including an electrical connector connected to the coil for supplying power to the coil;
    an AC cord for connecting the charging pad to a household AC outlet via the electrical connector; and
    a vehicle console including a vehicle connector for connecting the charging pad to a vehicle electrical supply, wherein the vehicle console includes shelves for supporting the charging pad at opposite edges of the charging pad.

6. The wireless charging system of claim 5 wherein the charging pad is in the form of a tray with a base wall and a perimeter wall extending upward from at least a portion of the base wall and a lip extending outward from the perimeter wall, wherein the lip is supported on the shelves.

7. The wireless charging system of claim 6 wherein contacts on the exterior of the perimeter wall connect with power supply contacts in the console.

8. A method for charging an electronic device including the steps of:
    a) connecting a wireless charging pad to a household electrical outlet;
    b) placing the electronic device on the wireless charging pad after said step a);
    c) moving the wireless charging pad to a vehicle after said steps a) and b);
    d) connecting the wireless charging pad to a vehicle power source after said step c);
    e) placing the electronic device on the wireless charging pad after said step b); and
    f) sliding the wireless charging pad into a shelf in the vehicle between said steps c) and e).

9. The method of claim 8 further including the step of placing the wireless charging pad in a storage bin of a vehicle console between said steps c and e).

* * * * *